United States Patent

Ogg

[15] 3,646,421
[45] Feb. 29, 1972

[54] WIND DIRECTION INDICATOR SYNCHRO SYSTEM

[72] Inventor: Robert D. Ogg, Portland, Maine
[73] Assignee: The Eastern Company
[22] Filed: Feb. 25, 1970
[21] Appl. No.: 14,000

[52] U.S. Cl. ............................................318/654, 318/681
[51] Int. Cl. .....................................................G05b 1/06
[58] Field of Search ..........................318/672, 681, 684, 654

[56] References Cited

UNITED STATES PATENTS

| | | |
|---|---|---|
| 3,155,890 | 11/1964 | Biderman et al.......................318/681 |
| 3,167,697 | 1/1965 | Anderson ...............................318/672 |
| 3,193,747 | 7/1965 | Kittrell...................................318/684 |
| 3,496,384 | 2/1970 | Wright et al............................318/678 |
| 3,523,234 | 8/1970 | Turtle.....................................318/681 |
| 3,378,739 | 4/1968 | Livengood et al. ....................318/678 |
| 3,427,520 | 2/1969 | Oppedahl ..............................318/678 |

OTHER PUBLICATIONS

Popular Electronics, May 1964, " Surge Suppressors," pages 78 and 79, author Louis E. Garner, Jr.

*Primary Examiner*—Benjamin Dobeck
*Attorney*—Eckhoff & Hoppe

[57] ABSTRACT

A synchro system of simple and inexpensive structure is provided which is particularly suitable for use as a wind direction indicator on sailboats. A transistorized oscillator is provided generating a current which is fed to a synchro transmitter which in turn is connected to an indicator. The indicator generates an error signal based on the phase difference between the current fed to the synchro and the position of a second synchro in the indicator and this phase difference is detected and amplified and used to operate a motor to turn the indicator. Variable damping can be employed.

1 Claims, 2 Drawing Figures

WIND DIRECTION INDICATOR SYNCHRO SYSTEM

SUMMARY OF THE INVENTION

The invention relates to a simple synchro system for a remote indicator and it is particularly adapted for use as a wind direction indicator on sailboats.

Synchro transmitters with synchro indicators have been used in the past and these are good for instantaneous indication of wind direction. However, they do not meet the needs of the modern racing sailor who needs to know the average direction of the wind. In the past it has been necessary to make an estimate of the average direction by observing the oscillation of the indicator.

This can be improved somewhat by the use of an AC servosystem with damping. However, this is ordinarily expensive and has a large power requirement so that it has generally not been accepted on privately owned vessels. Another method employs two 360° potentiometers with opposed wiping brushes applying a DC voltage to the remote masthead indicator and taking an error signal off a similar potentiometer in the indicator to drive a DC servosystem. Such a system has a particular weakness in the masthead unit since it is difficult to maintain good wiping contact under the rugged masthead conditions for any period of time. If the pressure is too light, corrosion rapidly sets in rendering the units inaccurate while if the pressure on the brushes is increased, the torque is increased so that the vane does not perform properly and the brush wear is excessive.

The device of the present invention obviates the above disadvantages by utilizing a masthead unit with a synchro which will readily respond to wind with a minimum of torque and which has infinitely long wear potentialities. This is accomplished by providing a transistorized oscillator, generating a relatively low frequency AC current, such as 400 cycles, and applying this to the synchro transmitter. The 400 cycles current is also applied as a reference voltage to a phase detector while the indicator generates an error voltage and the phase of this error voltage is compared with the phase of the current sent to the transmitter and passed through a differential amplifier. The differential amplifier operates a relatively low-cost DC servosystem for operating the indicator.

DESCRIPTION OF THE PREFERRED EMBODIMENT

Figure 1:
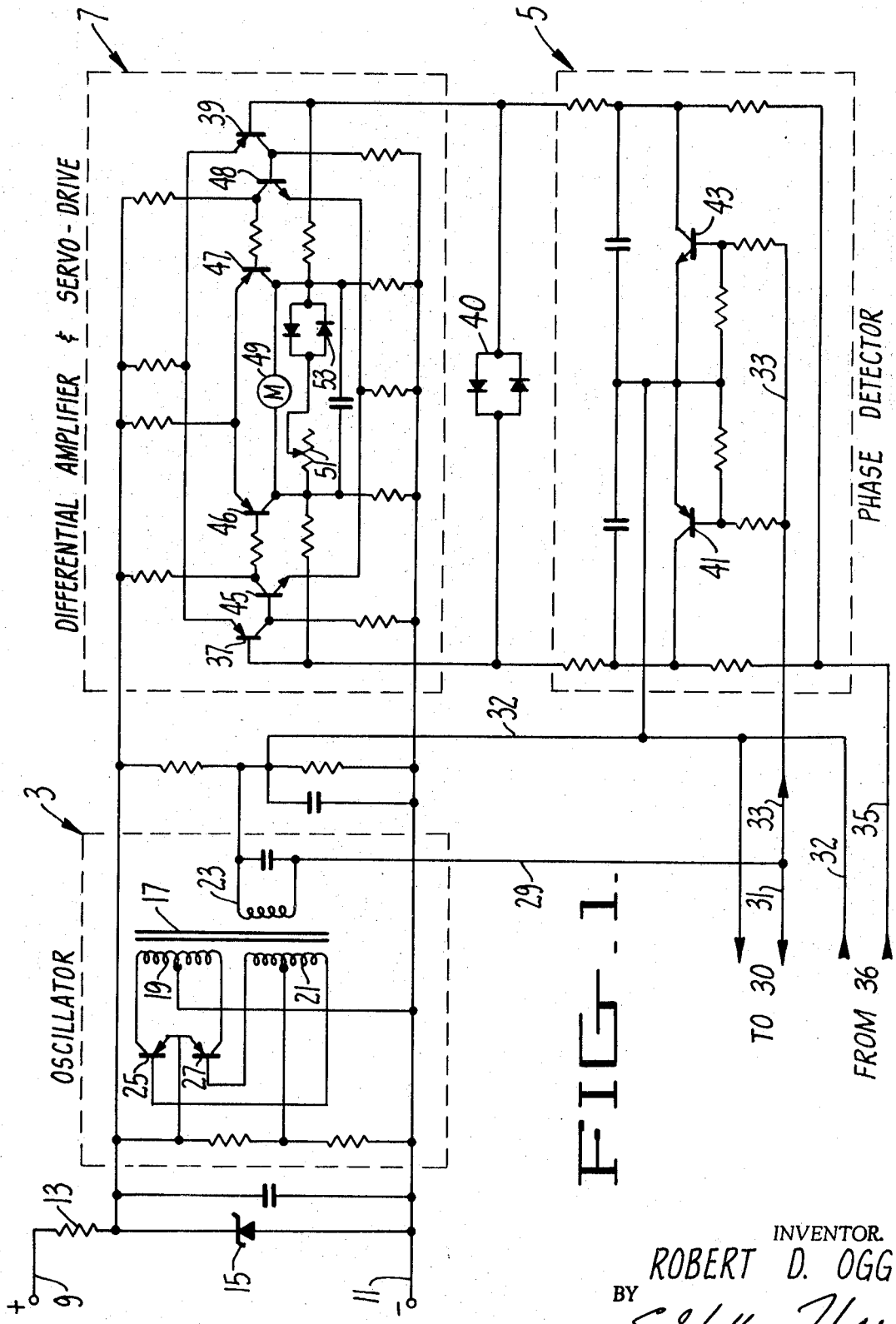
FIG. 1 of the drawing is a schematic diagram of a suitable circuit for carrying out the present invention.
Figure 2:
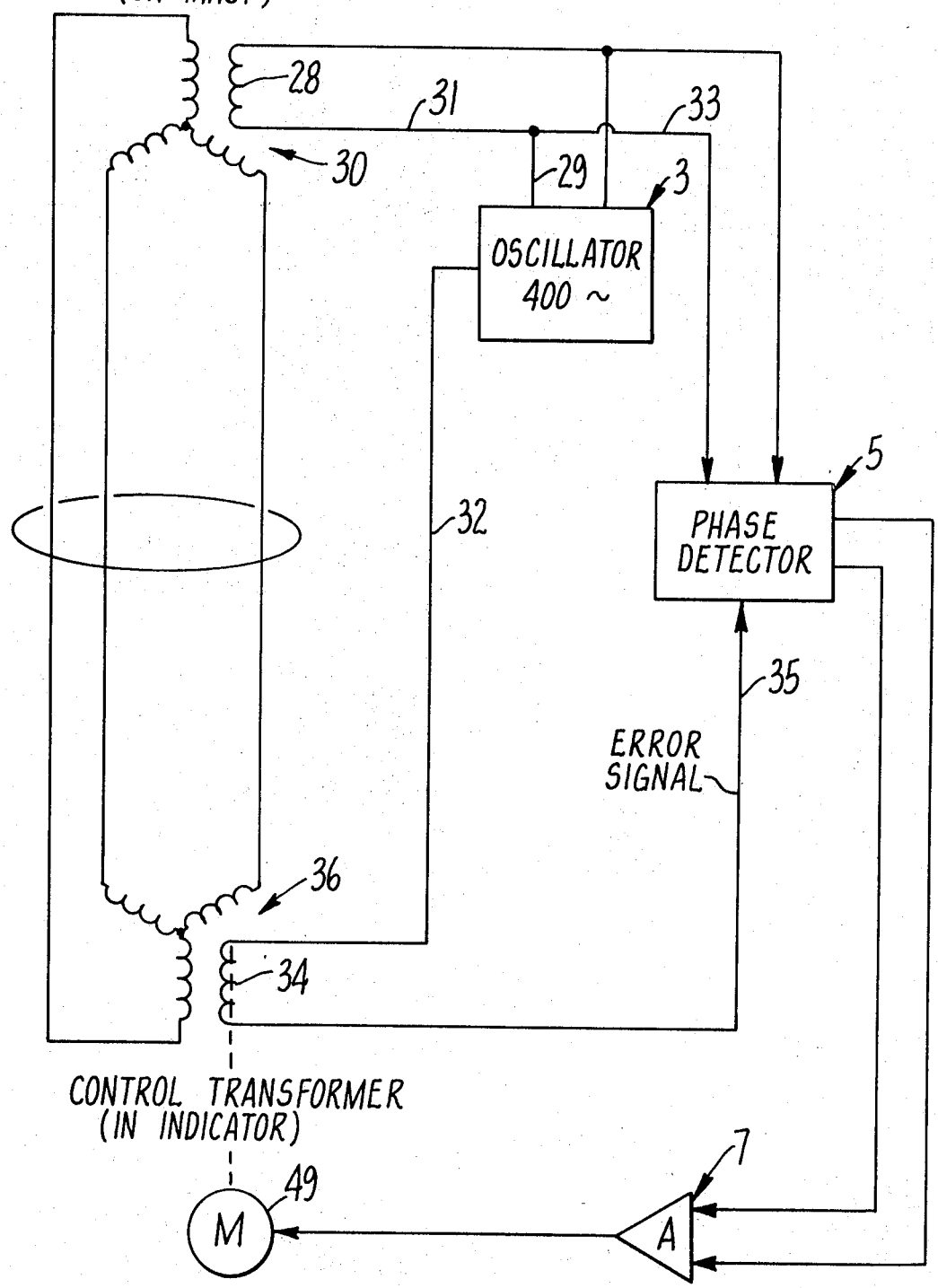
FIG. 2 is a block diagram of the entire servosystem.

Referring now to the drawings by reference characters, the main units include an oscillator 3, a phase detector 5 and a differential amplifier and servo drive unit 7.

A source of voltage is provided through the terminals 9 and 11 and preferably a voltage regulator circuit is included so that the unit can operate with wide excursions of the supply voltage such as from 10 to 20 volts. This includes a dropping resistor 13 and a zener diode 15. The regulated current is supplied to the oscillator, the differential amplifier and the phase detector.

The oscillator includes a conventional transistorized circuit having a transformer 17 with a primary winding 19, a feedback winding 21 and an output winding 23. Transistors 25 and 27 form an oscillatory circuit of any convenient frequency and in the example illustrated the frequency was 400 Hz. Output is taken from the secondary 23 through wire at 29, the output being connected by wire 31 to a rotor 28 of synchro transmitter 30, and through wire 33 as a reference voltage to the phase detector 5.

The indicator unit includes control transformer 36, which generates an error signal in rotor 34 at any time when the indicator is not lined up with the synchro transmitter. The error signal is taken through connection 35 and sent to the bases of transistors 37 and 39 of the differential amplifier 7. The reference signal through wire 33 is applied to the bases of transistors 41 and 43 of the phase detector 5 and the output signals are taken from the collectors of these two transistors and also applied to the bases of transistors 37 and 39 of the differential amplifier 7. Back-to-back diodes 40 are provided across the input to the differential amplifier as a safety measure so that the amplifier will not be overloaded by current spikes and the like.

The transistors 37 and 39 taken together with transistors 45, 46, 47 and 48 constitute a differential amplifier and if equal signals are applied to the input transistors 37 and 39, no signal is generated in the output transistors 46 and 47. The collectors of transistors 46 and 47 are connected to a motor 49 which is in turn connected to rotor 34 of the indicator device 36. Thus, if there is a phase difference appearing between the bases of transistors 37 and 39, this phase difference will be amplified and utilized to turn the motor 49 and thus restore the indicator to the proper position to agree with the position of the rotor, thus reducing the phase angle to zero and stopping motor 49.

The circuitry described acting through the differential amplifier has some inherent damping so that the indicator normally will read an average value over a short period of time. If additional damping is desired, a resistor 51 can be placed across the collector terminals of transistors 46 and 47 providing additional damping. The back-to-back diodes 53 prevent the value from going to zero, thus protecting the transistors.

I claim:

1. A remote control indicator comprising in combination:
   a. a first servo having a rotor,
   b. a second servo having a rotor,
   c. an oscillator generating an alternating current,
   d. a phase detector adapted to detect a phase difference between two currents, and having an electrical output reflective of a phase difference,
   e. a first connection between said oscillator and the rotor on said first servo for supplying alternating current to the rotor of said servo,
   f. a second connection from said oscillator to said phase detector for supplying a reference alternating current to the phase detector,
   g. a connection between the rotor of the second servo and the phase detector for supplying an error voltage to said phase detector,
   h. a differential amplifier connected directly to the output of said phase detector for amplifying a detected phase difference between said reference voltage and said error voltage,
   i. an output from said differential amplifier connected directly to a motor, said motor being connected to the rotor of the said second servo whereby the rotor of said second servo is driven to a position to cancel out said error voltage,
   j. the output of said phase detector being applied to the bases of a pair of transistors of said differential amplifier, a pair of back-to-back diodes being provided across the inputs to said bases, and
   k. said differential amplifier further comprising a second pair of transistors, the output of said first pair of transistors being connected to the bases of said second transistors, whereby an equal signal applied to the inputs to said first pairs of transistors results in a zero signal generation as an output of said second pair of transistors.

* * * * *